U.S. Patent Number: 4,476,687
Date of Patent: Oct. 16, 1984

Conklin et al.

[54] COOLING HEATED METAL SURFACES

[75] Inventors: Michael T. Conklin, South New Berlin; Charles F. Mowry, Rome, both of N.Y.

[73] Assignee: Fire Out Enterprises Company, Inc., South New Berlin, N.Y.

[21] Appl. No.: 585,616

[22] Filed: Mar. 5, 1984

Related U.S. Application Data

[63] Continuation of Ser. No. 382,558, May 27, 1982, abandoned.

[51] Int. Cl.³ .............................................. F25D 17/02
[52] U.S. Cl. .................................... 62/64; 252/174.21
[58] Field of Search .............................. 62/64; 169/43; 252/174.21

[56] References Cited

U.S. PATENT DOCUMENTS

| | | | |
|---|---|---|---|
| 2,677,700 | 5/1954 | Jackson et al. | 252/174.21 |
| 3,061,548 | 10/1962 | Dravnieks | 252/174.21 |
| 3,590,904 | 7/1971 | Woodburn, Jr. | 62/64 |
| 3,912,647 | 10/1975 | Adell | 169/43 |
| 4,033,737 | 7/1977 | Kunioka et al. | 62/64 |

Primary Examiner—Ronald C. Capossela
Attorney, Agent, or Firm—Roylance, Abrams, Berdo & Goodman

[57] ABSTRACT

A method for rapidly cooling heated surfaces by spraying a low volume liquid stream without foam onto a heated surface which not only conserves the volume of fluid used, but also more quickly cools the heated surface compared to conventionally used water systems. The method of this invention uses a composition formed from a concentrate comprising one or more nonionic surfactants having a combined cloud point of 68° F.–212° F. and sufficient water to form a concentrate solution of not greater than 30% by weight of the surfactant. The ultimate heated surface cooling composition is formed from the concentrate to be passed through a conventional pump with not greater than 0.2% by volume of the surfactant in order not to cause undesirable foaming or cavitation of the pump due to the low concentration of the surfactant. The heated surface cooling solution in this form is sprayed onto the hot surfaces of sheet metal or structural elements to cool these metal surfaces to a desirable temperature that may be as low as approximately 60° C.

19 Claims, No Drawings

COOLING HEATED METAL SURFACES

BACKGROUND OF THE INVENTION

This is a continuation of application Ser. No. 382,558 filed May 27, 1982 abandoned.

This invention relates broadly to methods of applying compositions to heated metal surfaces. More particularly, the present invention relates to a cooling solution of improved characteristics for rapidly lowering the temperature of heated surfaces.

There has long been a need for a liquid composition having the capability of rapidly cooling metal surfaces that may have been heated to extremely high temperatures. For instance, in the production of steel, most of it is cast in the form of ingots and then mechanically treated. Ingots are typically at the temperature range of 1090°–1430° C. according to the steel composition and then subjected to a hot working which usually includes one or more rolling, hammering or pressing operations.

This hot working is important to achieve for the steel an improvement in the mechanical properties such as the yield and tensile strength and particularly the ductility, provided that the temperature of the steel is above the thermal critical range of the steel. This high temperature requirement then necessitates a cooling operation which has been in the past ineffective and inefficient to effect a rapid cooling.

In the past, the heated metal surfaces have been cooled with water. Unfortunately, the volume of water required is great, and at times creates the problem of availability as well as the costliness of transporting such a great volume of water to the hot working site. In addition, the water would obviously be converted to steam with a lower heat conductivity resulting in a lowered heat absorbing capacity, and therefore a longer cooling cycle.

An ideal cooling liquid for lowering the temperature of heated metal surfaces will cool the metal surfaces quickly and economically. Water alone is not effective or efficient because of the great volume required. Conventional compositions containing various surfactants have not been satisfactory to even cool down a fire sufficiently to limit the lethal fumes. Adell, U.S. Pat. No. 3,912,647, for instance, discloses fire fighting compositions containing high concentrations of surfactants blended into a solvent and mixed with water to a viscous substance that is produced in an attempt to blanket the fire. A solvent such as naptha must be used to make the viscous gel flowable. Such high concentrations, in the range of about 3% or more surfactant do not satisfy current requirements.

OBJECTS OF THE INVENTION

It is the principal object of the present invention to provide a method for rapidly cooling heated surfaces.

It is also an object of the present invention to provide a method for a concentrate solution that can be added on the intake side of the pump without causing excessive foam or cavitation of the pump to produce a heated surface cooling solution to be sprayed onto the surface.

It is also an object of the present invention to provide a heated surface cooling solution and method for cooling metal surfaces after being hot worked particularly sheet steel following hot rolling.

This invention also has an object the provision of a heated surface cooling solution and method for cooling metal surfaces particularly structural steel elements of a petroleum rig.

SUMMARY OF THE INVENTION

Metal surfaces that have been heated by various means are cooled by spraying a low volume liquid stream without foam onto the heated surface to not only conserve the volume of fluid used, but also to more quickly cool the heated metal surface compared to conventionally used water systems. The method of this invention uses a composition formed from a concentrate comprising one or more nonionic surfactants having a combined cloud point of 68° F.–212° F. and sufficient water to form a concentrate solution of not greater than 30% by weight of the surfactant. The ultimate heated surface cooling composition is formed from the concentrate to be passed through a conventional pump with not greater than 0.2% by volume of the surfactant in order not to cause undesirable foaming or cavitation of the pump due to the low concentration of the surfactant. The heated surface cooling solution in this form is sprayed onto the hot surfaces of sheet metal or structural elements to cool these metal surfaces to a desirable temperature that may be as low as approximately 60° C.

DETAILED DESCRIPTION OF THE INVENTION

The liquid cooling composition of the present invention comprises very low aqueous concentrations of one or more nonionic surfactants having a combined cloud point between 68° F.–212° F. These compositions are formed as aqueous solutions from a concentrate solution of the surfactant. This concentrate solution is made available for use by education, for instance, into water stream on the intake side of the conventional pump for spraying discharge through any conventional discharge line without excessive foaming or cavitation of the pump.

The surfactants useable for the present invention include those nonionic surfactants having a cloud point between 68° F.–212° F. or which when combined produce a composite cloud point in that range. A cloud point below 68° F. for the sole or combination of surfactants would render them not sufficiently soluble to be useful, also a surfactant with a cloud point above 212° F. loses its cooling capability. However, it is possible that combinations of more than one nonionic surfactant, each of which having a cloud point outside the specified range, could together produce a composite cloud point within the specified range and be sufficiently soluble and effective for the purposes of this invention.

In general it has been found that the surfactants useful to perform functions of the present invention are primarily, although not exclusively, those obtained through the condensation of ethylene oxide or propylene oxide with various substances and particularly with phenolic compounds having a side chain. Among the substances are the following: fatty acids such as stearic, lauric, palmitic, etc.; fatty alcohols such as mannitol, sorbitol, etc.; primary, secondary or tertiary alcohols such as ethanol, isopropyl or isobutyl alcohols, etc.; fatty amines or amides; alkylolamines and block copolymers with ethylene and propylene oxides with M.W. of 1100–15,500, block copolymers of oxypropylene oxyethylene polyols derived from ethylene diamine. Of particular usefulness are those surfactants produced by the condensation of ethylene oxide with alkylphenols. The alkyl group may have from 1 to 12 or more carbon atoms though particularly 6 to 9 carbon atoms is preferred such as octyl-, nonyl-, etc.

Combinations of one or more nonionics are selected to provide water solubility in the 68° F.–212° F. cloud point range and to provide the least amount of foam.

In the formation of the surfactant the quantity of the molecules of ethylene oxide may be varied from below 3 to up to 40 although preferably from 1.5 to 9.

In the practice of the present invention the concentrate solution is formed with not more than 30% by weight of the nonionic surfactant and preferably 20–29% by weight of the surfactant. If greater amounts of the surfactant are used such that the concentration is greater than 30% by weight of the surfactant in water, the surfactant forms a gel rendering it less useable if at all. It is therefore important to maintain the concentration of the nonionic surfactant at a maximum of 30% by weight.

It is this concentrate solution that is placed in a storage or supply tank and provided for use. This solution concentrate when maintained in the storage tank at a maximum concentration of 30% by weight can be stored for ready use to form the heated surfaces cooling solution. It is from this storage tank that the concentrate may be educted into the intake side of a conventional pump with its discharge spraying one or more liquid streams onto the heated surfaces. Of course the concentrate solution can be premixed to form the cooling solution and taken into the pump at the intake side for spraying out through the discharge lines.

The concentrate solution has the unique characteristic of being able to be educted into the intake side of the pump rather than having to be educted into the nozzle of the discharge line. Such capability provides for the mixing and forming of the cooling solution at the intake side of the pump so that the discharge is capable of dispensing the liquid stream without excessive foam or cavitation that would overheat and disable the pump. The need as in the prior art for individual eduction and metering means at each discharge site is negated with consequent economy.

To use the concentrate solution, a conventional eductor or metering means may be provided to the intake side of the conventional pump. If the usual pumper trucks are used to cool metal structural rigs, the pump capacities are in the range of 250 gpm, 500 gpm, 750 gpm, 1000 gpm, 1250 gpm and 1500 gpm. In the 1500 gpm pumper, usually six 2½ inch lines each rated at a capacity of 250 gpm may be provided. Before this invention when eductor equipment was used to feed prior compositions into the discharge line, the pipe size was reduced to 1½ inch having only a 100 gpm capacity. Thus with the proportioning and metering equipment installed that particular line is useful only for purposes of producing and spraying foam thereby diminishing the versatility of the pumper. In accordance with the present invention, however, each of the six 2½ inch discharge lines is useable to spray the cooling solution at its rated capacity.

In use for cooling sheet metal surfaces in a hot rolling mill, for instance, the cooling solution after being formed from the concentrate can be pumped into any form of discharge system currently in use to spray the heated metal surfaces. When an oil rig, for instance, is to be cooled, the structural elements are sprayed with the cooling liquid preferably from a pumper as discussed above.

The cooling solution is formed from the concentrate solution in an amount such that the solution contains between 0.02% to 0.2% by volume of the surfactant. Preferably, the solution would have the surfactant in the concentration of between 0.03% to 0.1% by volume. When premixed from the concentrate to the specified concentration, the pump draws in the premixed cooling solution.

Concentration of this surfactant in the cooling solution is important in enabling the heat to be absorbed very rapidly from the metal surfaces. It has been found that the low concentration enables the heat to be absorbed by a cloud generated from the cooling solution so as to more rapidly cool the metal surfaces compared to any other liquid composition.

The low concentration of the nonionic surfactant in the cooling solution is also desirable because it enables the pump to pump the solution without excessive foam or cavitation that would damage the pump or limit the distance to which the water stream would be directed. To demonstrate the importance of the concentration not being greater than 0.2% by volume of the surfactant a surfactant concentration of 0.5% by volume such as disclosed in Nieneker, et al., U.S. Pat. No. 3,578,590 was used in a truck having a 500 gallon capacity. The particular nonionic used was a nonylphenol ethyoxylate with 9 moles of ethylene oxide. This provided 0.3% of the nonionic surfactant to the water stream and the mixture was pumped through a standard nozzle set at 60 gallons per minute. The mixture when added to the intake side of the pump and sprayed at a maximum distance of 55–60 feet as compared to a distance of 82 feet either with plain water or with the formulation of the present invention utilizing a maximum of 0.2% nonionic surfactant in the water. This illustrates that there was some foaming in the use of the prior art composition that caused a loss of pressure sufficient to reduce the spray distance.

Further to demonstrate the distinction between the present invention and prior art compositions, the hose nozzle was shut off to allow the nonionic solution to circulate through the conventional bypass valve back into the water supply tank. In three minutes the pump began to overheat due to foam generated in the pump. The resulting cavitation in the pump would have damaged the pump and rendered it useless. When the nozzle was again open to the 60 gallon per minute flow rate a stream of 25–40 feet resulted. The water stream was not continuous but tended to spurt. After all the water was pumped out of the tank the tank gauge still registered full but inspection of the tank indicated that it was full of dense foam which gave the false indication of the quantity of the content of the tank. The foam so impeded the operation that even the refill of the tank was ineffective.

The following examples illustrate the effectiveness of this invention. It is understood that these examples are not intended to limit the scope of the invention.

Examples 1 and 2 were conducted with the cooling composition of the present invention which was formed from a concentrate composed by weight of 74% water, 21.0% nonylphenoxy polyethoxy ethanol, with 9 moles of ethylene oxides, 4.0% block polymer a nonylphenoxy polyethoxy ethanol having a mixture of condensation product with 3 and 9 moles of ethylene oxide, molecular weight 2900, cloud point 136° F. and 0.8% corrosion inhibitors, such as sodium nitrate and boramide (boric acid and monoethanol amine) and optional 0.2% biocidal inhibitors such as sodium 1-hydroxy pyridine-2-thione. The corrosion inhibitors may be conventional however a 2:1 to 1:2 ratio by weight of sodium nitrate and boramide from 0.1% to 3% by weight is adequate. The biocide may be present between 0.001%–1% by weight and may also include one or more of the following: sodium omadine—Olin Corp. (1-hydroxy pyridine-2-thione sodium salt); proxel CRL-ICI America (1,2 benzisothiazoline 3-one); Kathon 886—Microbiocide, Rohm & Haas (8.6% 5-chloro-2-methyl-4-isothiazoline-3-one) and (2.6% 2-methyl-4-isothiazoline-3-one). This mixture has a cloud point of 137° F. One gallon (1) of this concentrate was premixed with 500 gallons of water and drawn into the intake side of a pumper. This provides 0.2% of the concentrate solution or 0.05% by volume of the nonionic ingredients in the cooling solution.

EXAMPLE 1

A slab from the slabbing mill at a temperature of over 1100° C. is hot rolled to a plate or sheet. The liquid cooling composition is to be sprayed onto the heated surface of the plate or sheet and in a few minutes, the plate is at a temperature of below 80° C. and usually below 60° C.

EXAMPLE 2

An oil rig when set ablaze with an oil fire heats to a very high temperature all the structural elements of the rig. The liquid cooling composition would then be sprayed onto the structural steel elements of the rig to cool it in a few minutes. The metal surfaces are then comfortable to the touch.

From these examples it should be clear that the objects as set forth above have been met. This invention should only be limited by the appended claims in which We claim:

1. The process of rapidly cooling heated surfaces comprising,
   preparing a concentrate consisting essentially of one or more nonionic surfactants having a cloud point of 68° F.–212° F. and sufficient water to form not greater than 30% by weight of a concentrate solution of said surfactant,
   mixing said concentrate with water to form a solution of said surfactant not greater than 0.2% by volume of said surfactant,
   applying said solution on a heated surface and simultaneously cooling said surface at a rapid rate.
2. The process of claim 1 including,
   the heated surfaces being metal heated to elevated temperatures.
3. The process of claim 2 including,
   said heated surfaces being metal and being structural steel elements.
4. The process of claim 2 including,
   said heated surfaces being sheet steel.
5. The process of claim 2 including,
   said surfactant being selected from the group consisting of alkylphenoxy polyoxyethylene ethanols.
6. The process of claim 5 including,
   said alkylphenoxy group being nonylphenol and said polyoxyethylene group containing from 1.5–40 moles of ethylene oxide.
7. The process of claim 2 including,
   said composition consisting essentially of said nonionic surfactant and a biocide and a corrosion inhibitor.
8. The process of claim 2, 3, 4, 5, 6 or 7 including,
   said surfactant being present in said solution in an amount between 0.02 to 0.2% by volume.
9. The process of claim 8 including,
   said surfactant being present in the amount of 0.3% to 0.1% by volume.
10. The process of claim 1 including,
    said surfactant being selected from the reaction products from the condensation of an oxide selected from the group consisting of ethylene and propylene and one or more compounds selected from the group consisting of fatty acids, fatty alcohols, primary, secondary, and tertiary alcohols, fatty amines, fatty amides, alkylolamines and block copolymers with ethylene and propylene oxides with M.W. of 1100–15,000, block copolymers of oxypropylene oxyethylene polyols derived from ethylene diamine.
11. The process of rapidly cooling hot surfaces comprising,
    providing a heated surface to be cooled to hand held temperatures, contacting said surfaces with an aqueous solution of a nonionic surfactant having a cloud point of 68° F.–212° F. at a concentration of not greater than 0.2% by volume of said surfactant to cool said surfaces to a temperature sufficiently low to permit hand touching.
12. The process of claim 11 including,
    said surfactant being selected from the group consisting of alkylphenoxy polyoxyethylene ethanols.
13. The process of claim 12 including,
    said surfactant being selected from the group consisting of nonylphenoxy polyoxyethylene ethanol containing from 1.5–40 moles of ethylene oxide.
14. The process of claim 12 or 13 including,
    said mixing of said concentrate with water being at the intake side of a pump for said spraying.
15. The process of claim 14 including,
    said surfactant being present in said solution in an amount between 0.02 to 0.2% by volume.
16. The process of claim 12 including,
    said alkylphenoxy group being nonylphenol and said polyoxyethylene group containing from 1.5–40 moles of ethylene oxide.
17. The process of claim 12 including,
    said composition consisting essentially of said nonionic surfactant and a biocide and a corrosion inhibitor.
18. The process of claim 12 including,
    preparing a concentrate comprising one or more nonionic surfactants having a combined cloud point of 68° F.–212° F. and sufficient water to form not greater than 30% by weight of a concentrate of said surfactant,
    mixing said concentrate with water to form said solution of said surfactant not greater than 0.2% by volume of said surfactant and
    spraying said solution as at least one water stream without foam.
19. The process of claim 11 including,
    said surfactant being selected from the group consisting of ethoxylated alcohols.

* * * * *